INVENTOR.
ROBERT L. GOLDEN
BY
HIS ATTORNEYS

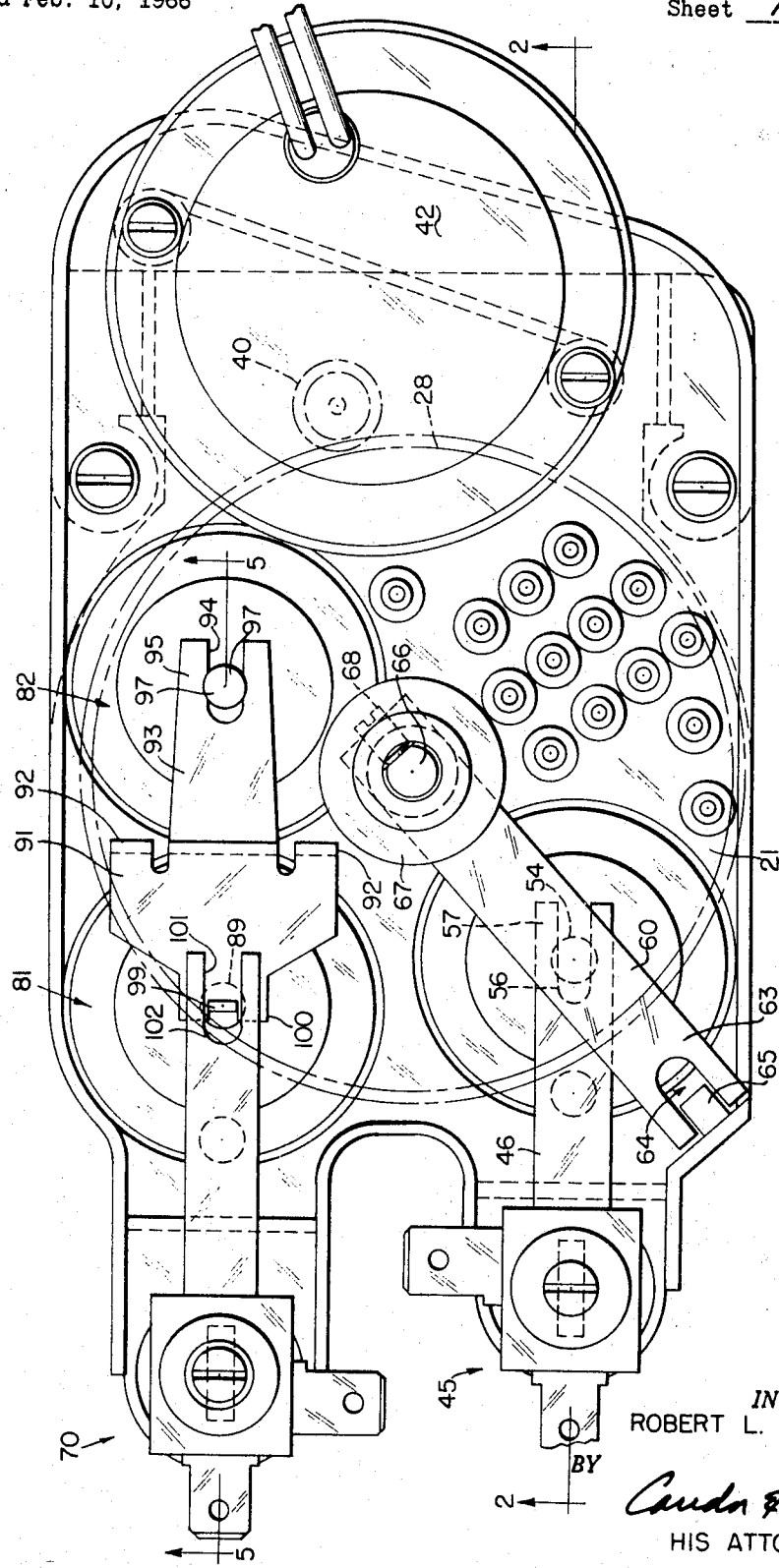

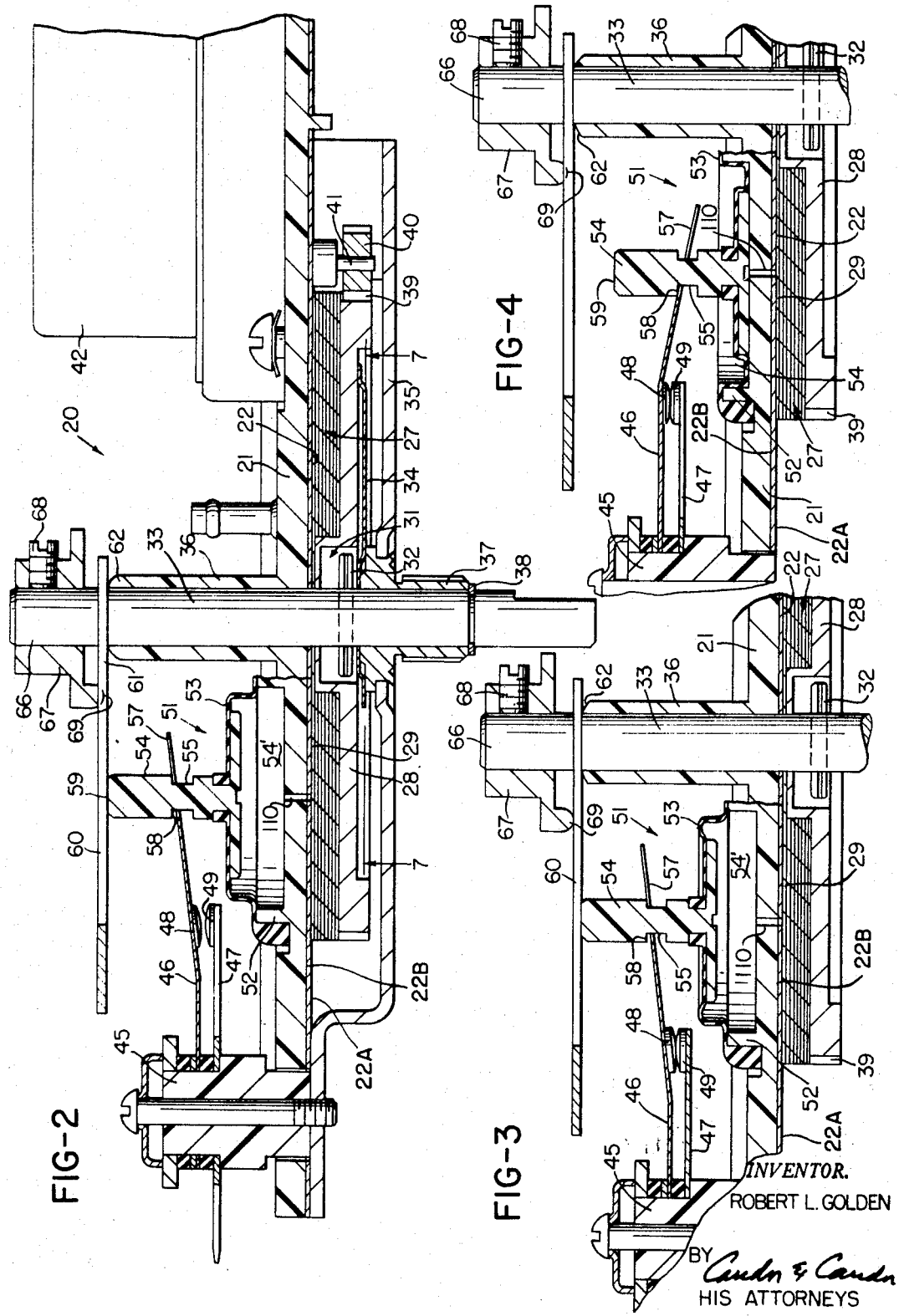

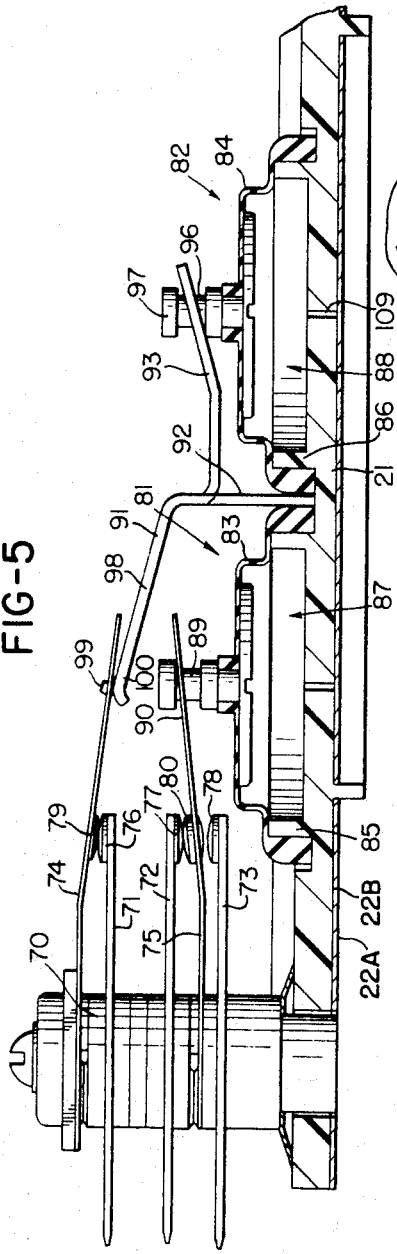

United States Patent Office 3,440,368
Patented Apr. 22, 1969

3,440,368
PROGRAMMER MEANS AND PARTS THEREFOR
Robert L. Golden, Greensburg, Pa., assignor to Robertshaw Controls Company, Richmond, Va., a corporation of Delaware
Filed Feb. 10, 1966, Ser. No. 526,483
Int. Cl. H01h 7/08, 43/10
U.S. Cl. 200—38                                    18 Claims

ABSTRACT OF THE DISCLOSURE

This disclosure relates to a program controlling means wherein a reading sheet is moved relative to a reading head by a timer motor that is energized by an electrical switch mounted on the reading head base plate, the "on-off" shaft for the program member initially closing the electrical switch when moved to its "on" position. A pneumatically operated actuator is operated by the program member to hold the electrical switch in its "on" position after the initial staring operation of the timer motor. In addition, pneumatically operated electrical switches are mounted on the rear side of the reading head base plate with the pneumatic actuator controlling pivotally mounted lever means that operate the electrical switches.

---

This invention relates to an improved programmer means for controlling a domestic appliance or the like as well as to improved parts for such a programing means or the like.

One feature of this invention is to provide an improved programming means for a domestic appliance or the like wherein the programming means has means to manually set the program member in its starting position while simultaneously causing the operation thereof, the operating programming means having means to thereafter terminate the operation when the programming means reaches its stopping position.

In addition, another feature of this invention is to provide improved actuator means for such a program controlling system or the like.

Accordingly, it is an object of this invention to provide an improved control system having one or more of the novel features set forth above or hereinafter shown or described.

Another object of this invention is to provide improved parts for such a control system or the like.

Other objects, uses and advantages of this invention are apparent from a reading of this description which proceeds with reference to the accompanying drawings forming a part thereof and wherein:

FIGURE 1 is a top view of the improved programming means of this invention.

FIGURE 2 is a cross-sectional view taken on line 2—2 of FIGURE 1.

FIGURE 3 is a fragmentary view similar to FIGURE 2 and illustrates the control device in another operating position thereof.

FIGURE 4 is a view similar to FIGURE 3 and illustrates the control device in still another operating position thereof.

FIGURE 5 is a cross-sectional view taken on line 5—5 of FIGURE 1.

FIGURE 6 is a view similar to FIGURE 5 and illustrates the device of FIGURE 5 in another operating position thereof.

FIGURE 7 is a reduced view taken substantially on line 7—7 of FIGURE 2.

Figure 8:
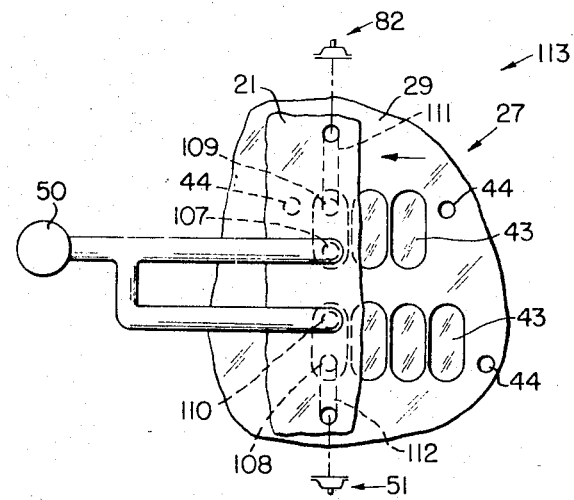
FIGURE 8 is a schematic view illustrating the improved control system of this invention.

While the various features of this invention are hereinafter described and illustrated as being particularly adaptable for controlling the operation of a domestic appliance, such as a washing machine, dish washer or the like, it is to be understood that the various features of this invention can be utilized singly or in any combination thereof to provide control means for other devices as desired.

Therefore, this invention is not to be limited to only the embodiment illustrated in the drawings because the drawings are merely utilized to illustrate one of the wide variety of uses of this invention.

Figure 10:
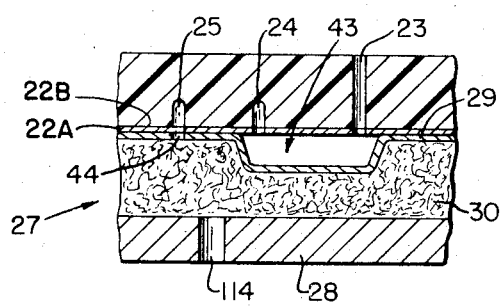
FIGURE 10 is an enlarged, fragmentary cross-sectional view of the program member of this invention.

Referring now to FIGURES 1 and 2, an improved programming means of this invention is generally indicated by the reference numeral 20 and includes a base means 21 having a flat reading surface 22 interrupted by a plurality of port means similar to the port means 23, 24 and 25 illustrated in FIGURE 10, the flat reading surface 22 of the base means 21 being defined by a sheet of flexible tape 22A having a pressure sensitive adhesive side thereof secured to the surface 22B of the base means 21.

A rotatable program member 27 is provided and, as illustrated in FIGURES 2 and 10, comprises a rigid backing member 28 effectively interconnected to a flexible reading sheet 29 so that the same rotate in unison, a porous compressible material 30 being disposed between the backing member 28 and the reading sheet 29.

The backing member 28 has a slot 31 in one side thereof receiving a pin 32 carried by a manually adjustable shaft 33 whereby the shaft 33 and program member 27 rotate in unison.

A spider shaped leaf spring means 34 is disposed between the backing member 28 and a bracket means 35 carried by the base means 21 so that the spring means 34 urges the program member 27 toward the reading surface 22 of the base means 21 to place the flexible sealing means 29 in sealing and sliding contact therewith.

In particular, the tape means 22A functions in the same manner as the reading head tape means disclosed and claimed in the copending patent application, Ser. No. 262,885, filed Mar. 5, 1963, now U.S. Patent No. 3,284,-589, and assigned to the same assignee to whom this application is assigned, the purpose of the tape means 22A being more fully described hereinafter.

The manually adjustable shaft 33 projects through a tubular projection 36 of the base means 21 as well as a tubular projection 37 of the bracket means 35, the shaft 33 carrying a snap ring 38 disposed against the tubular extension 37 to prevent axial movement of the shaft 33 relative to the base means 21.

The backing member 28 of the program member 27 has a ring gear means 39 at the outer periphery thereof disposed in meshing relation with a pinion gear means 40 carried on an output shaft 41 of an electrical timer motor 42 carried by the base means 21. Thus, when the timer motor 42 is energized in a manner hereinafter set forth, the same will rotate the program member 27 and shaft 33 relative to the reading surface 22 of the base means 21 for a purpose hereinafter described.

The reading sheet 29 of the program means 27 has a plurality of blister or channel means 43 formed therein in a predetermined pattern similar to FIGURE 8 and as shown in FIGURE 10 whereby each blister means 43 is adapted to interconnect together at least two of the port means in the base means 21 for a purpose hereinafter described.

In addition, the reading sheet 29 has a plurality of aperture means 44 passing therethrough adapted to be aligned with certain of the port means in the base means 21 for a purpose hereinafter described.

As illustrated in FIGURES 1 and 2, a terminal post 45 is carried by the base means 21 and carries a flexible switch blade 46 and a fixed switch blade 47, the flexible switch blade 46 having an electrical contact 48 cooperable with a fixed contact 49 carried by the fixed blade 47.

The switch blades 46 and 47 are so constructed and arranged that the same energize the timer motor 42 as well as a vacuum pump means 50, FIGURE 8, when the contacts 48 and 49 are placed in electrical contact with each other in the manner illustrated in FIGURES 3 and 4.

A vacuum operated actuator 51 is carried by the base means 21 and includes an annular raised rib 52 projecting from the base means 21 and carrying a flexible diaphragm 53 which cooperates with the base means 21 to define a chamber 54' therebetween. The flexible diaphragm 53 carries a post 54 movable with the diaphragm 53, the post 54 having an annular groove 55 received in a slot 56, FIGURE 1, at the end 57 of the spring switch blade 46. The annular groove 55 defines a shoulder 58 on the post 54 against which the spring blade 46 is normally biased.

The post 54 has a free end 59 bearing against a lever 60 having one end 61 telescoped over the shaft 33 and bearing against the end 62 of the tubular projection 36 for a fulcrum point means in a manner hereinafter described. The other end 63, FIGURE 1, of the lever 60 has a slot 64 passing therethrough and receiving a guide means 65 attached to the base means 21.

The free end 66 of the shaft 33 carries a cam means 67 telescoped thereon and fastened thereto by a set screw 68 to rotate in unison with the shaft 33, the cam means 67 having a cam surface 69 engageable with the lever 60 for pivoting the same about the fulcrum shoulder 62 for a purpose hereinafter described.

Another terminal post 70 is carried by the base means 21 in the manner illustrated in FIGURES 1 and 5 and carries three fixed switch blades 71, 72, and 73 and two flexible spring switch blades 74 and 75, the fixed blades 71, 72 and 73 respectively carrying contacts 76, 77 and 78 and the movable spring switch blades 74 and 75 respectively carrying contacts 79 and 80.

Another pair of vacuum operated actuators 81 and 82 are carried by the base means 21 and include flexible diaphragms 83 and 84 respectively cooperating with annular flanges 85 and 86 on the base means 21 to respectively define chambers 87 and 88.

The flexible diaphragm 83 of the actuator 81 carries a post means 89 interconnected to the end 90 of the spring switch blade 75 in a manner similar to the post 54 previously described.

When the chamber 87 of the actuator 81 is at atmospheric conditions, in the manner illustrated in FIGURE 5, the blade 75 assumes the normal position illustrated in FIGURE 5 whereby the contact 80 is placed into electrical contact with the contact 77 and out of contact with the contact 78. However, when the vacuum source 50 is interconnected to the chamber 87 in a manner hereinafter described, the flexible diaphragm 83 is pulled downwardly in the manner illustrated in FIGURE 6 to move the contact 80 out of contact with the contact 77 and place the contact 80 into contact with the contact 78 for any suitable purpose.

The other actuator 82 is operatively interconnected to the spring blade 74 by a lever means 91. The lever means 91 as illustrated in FIGURES 1 and 5 has a pair of depending legs 92 receivable in suitable slots (not shown) in the base means 21 whereby such slots permit the lever 91 to pivot between the positions illustrated in FIGURES 5 and 6. The lever has an arm 93 provided with a slot 94 in the end 95 thereof receiving a reduced portion 96 of a post means 97 carried by the flexible diaphragm 84 of the actuator 82. Another arm 98 extends from the lever 91 and has a reversely directed tab 99 at the free end 100 thereof which is received in a slot 101 provided at the free end 102 of the spring blade 74.

Thus, when the chamber 88 of the actuator 82 is at atmospheric conditions, the spring blade 74 is disposed in the position illustrated in FIGURE 5 to not only hold the lever 91 in the position illustrated in FIGURE 5 but to also place the contact 79 into electrical contact with the contact 76.

However, when the chamber 88 of the actuator 82 is interconnected to the vacuum source 50 in a manner hereinafter described, the flexible diaphragm 84 of the actuator 82 is pulled downwardly from the position illustrated in FIGURE 5 to the position illustrated in FIGURE 6 whereby the lever 91 is pivoted in a clockwise direction to cause the arm 98 thereof to raise upwardly and carry the spring blade 74 therewith to hold the contact 79 out of electrical contact with the contact 76, such relative movement between the spring blade 74 and the arm 98 of the lever 91 being permitted by the slot means 101 in the spring blade 74.

While the chambers 54', 87 and 88 of the actuators 51, 81 and 82 can be interconnected to the vacuum source 50 by means of the programmer 27 through flexible conduits, the embodiments illustrated in the drawings comprises groove means and port means in the reading head 21.

Figure 9:
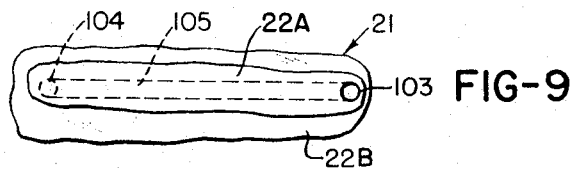
FIGURE 9 is a fragmentary plan view illustrating the port connecting means of this invention.

In particular, reference is made to FIGURE 9 wherein a port 103 is formed in the base means 21 and passes through the tape means 22A. The port 103 is interconnected to a port 104 by a groove means 105 formed in the surface 22B of the base means 21 and is covered by a tape means 22A, the port 104 completely passing through the base means 21 and leading to the chamber of the particular vacuum operated actuator means.

For example, reference is made to FIGURE 8 wherein the inlet of the vacuum pump 50 is interconnected to ports 107 and 108 in the reading head 21. Another pair of ports 109 and 110 are formed in the reading head 21 and are interconnected respectively to the chambers of the actuators 82 and 51 by groove means 111 and 112 formed in surface 22B of the base means and covered by the tape means 22A in the manner previously described and fully disclosed and claimed in the aforementioned copending patent application.

Thus, it can be seen that the single sheet of tape means 22A seals the aforementioned grooves and associated ports from the atmosphere except where the ports pass through the tape means 22A.

The operation of the control system illustrated schematically by the reference numeral 113 in FIGURE 8 as well as structurally in the other figures of the drawings will now be described.

With the manually operated control shaft 33 of the program means 20 being disposed in a position where the program member 27 is in an off position thereof, the cam surface 69 of the cam means 67 is so constructed and arranged that the same does not cam the lever 60 downwardly sufficiently to cause the contacts 48 and 49 to be placed in electrical contact with each other.

The operator grasps a suitable control knob interconnected to the shaft 33 and rotates the same to an on position thereof. When the shaft 33 is rotated to its on position, the program member 27 is rotated in unison therewith and is placed in its starting position relative to the base means 21. As the shaft 33 is rotated to its on position, the cam surface 69 of the cam means 67 rotates in unison therewith and cams the lever 60 downwardly in a counterclockwise direction from the position illustrated in FIGURE 2 to the position illustrated in FIGURE 3 to place the contacts 48 and 59 in electrical contact with each other to thereby energize the timer motor 42 and the vacuum pump 50.

With the timer motor 42 now energized, the same begins to rotate the program member 27 through the pinion gear means 40 and ring gear means 39 whereby the program member 27 and shaft 33 rotate in unison to cause the blister means 43 and aperture means 44 of the flexible reading sheet 29 to pass over the various ports in the reading head 21 to actuate and deactuate various actuators by interconnecting the vacuum source 50 thereto or disconnecting the vacuum source 50 therefrom whereby the program member 27 operates the appliance through a predetermined cycle.

The cam surface 69 on the cam means 67 is so constructed and arranged that as the program member 27 rotates from its starting position toward its stopping position, the cam surface 69 maintains the lever 60 in a position to continuously place the contacts 48 and 49 in electrical contact with each other so that the timer motor 42 and vacuum pump 50 are continuously operated.

As the program member 27 rotates, it can be seen in FIGURE 8 that a series of blister means 43 of the flexible sheet 29 bridge the ports 109 and 107 to interconnect the vacuum source 50 with the chamber 88 of the actuator 82 to cause the flexible diaphragm 84 thereof to be pulled downwardly from the position illustrated in FIGURE 5 to the position illustrated in FIGURE 6 whereby the contact 79 is moved away from the contact 76. However, when an aperture means 44 of the flexible sheet 29 is aligned with the port 109 in the base means 21, it can be seen that air is adapted to return to the chamber 88 of the actuator 82 by passing through a suitable aperture 114 in the backing member 28, through the porous resilient material 30 and into the aligned aperture means 44 and port means 109 so that the actuator 82 can return to the position illustrated in FIGURE 5 and place the contact 79 again in electrical contact with the contact 76.

Therefore, it can be seen that as the program member 27 rotates, the same operates various vacuum operated actuators in a predetermined sequence to control the entire operation of the appliance or the like.

However, as the program member 27 rotates, a series of blister means 43 of the flexible sheet 29 begin to bridge the ports 108 and 110 in the manner illustrated in FIGURE 8 whereby the vacuum source 50 is now interconnected to the chamber 54' of the actuator 51 to pull the flexible diaphragm 53 downwardly to the position illustrated in FIGURE 4 whereby the actuated actuator 51 maintains the contacts 48 and 49 in electrical contact with each other as long as the chamber 54' is interconnected to the vacuum source 50.

At this time, the cam surface 69 of the cam means 67 is so constructed and arranged that further rotation of the program member 27 by the timer motor 42 moves the cam means 67 in such a manner that the cam surface 69 would not be effective to came the lever 60 downwardly sufficiently to maintain the contacts 48 and 49 in electrical contact with each other.

However, since the actuator 51 is now holding the contacts 48 and 49 in electrical contact with each other, the timer motor 42 and vacuum pump 50 are continuously operated.

When the program member 27 is rotated to its stopping position by the timer motor 42, it can be seen in FIGURE 8 that a suitable aperture means 44 in the flexible reading sheet 29 is brought into alignment with the port 110 in the base means 21 to interconnect the atmosphere with the chamber 54' of the actuator 51 so that at this position, the actuator 51 is deactuated and the spring blade 46 moves the contact 48 away from the contact 49 to deenergize the timer motor 42 and vacuum pump 50 whereby the particular cycle of operation of the program means 20 of this invention is terminated as the cam surface 69 permits the lever 60 to be moved upwardly to a position that the contacts 48 and 49 can be separated.

Therefore, it can be seen that when the program member 27 is rotated to its stopping position by the timer motor 42, the program member 27 terminates the operation of the timer motor 42 as well as the operation of the vacuum pump 50 so that the system 113 of this invention is completely turned off.

In this manner, the operator meremly grasps the control knob interconnected to the shaft 33 to move the same to its on position to start the operation of the system 113 whereby the program member 27 will turn off the system 113 at the end of the cycle of operation, the program member 27 during rotation from its starting position to its stopping position actuating various actuator means in the manner previously described as well as the actuator means 51 to permit the automatic cycle termination feature of this invention.

Accordingly, it can be seen that this invention not only provides an improved control system having many unique and novel features, but also this invention provides improved parts for such a control system or the like.

While the form of the invention now preferred has been disclosed as required by the statutes, other forms may be used, all coming within the scope of the claims which follow.

What is claimed is:

1. In combination, frame means, a program member movably carried by said frame means and having a starting position and a stopping position, motor means for moving said program member from its starting position to its stopping position, an actuator carried by said frame means for energizing said motor means when said actuator is actuated, manual means for moving said program member to its starting position, said manual means having means initially actuating said actuator when said manual means sets said program member at its starting position, and means controlled by said program member to maintain said actuator in its actuated position until said program member reaches its stopping position.

2. A combination as set forth in claim 1 wherein said last-named means is rendered operable by said program member between its starting and stopping positions.

3. A combination as set forth in claim 1 wherein said manual means moves in unison with said program member.

4. A combination as set forth in claim 1 wherein said program member causes said last-named means to be inoperable when said program member reaches its stopping position whereby said actuator is deactuated and said motor means is, thus, deenergized.

5. A combination as set forth in claim 1 wherein said program member is rotatably carried by said frame means, wherein said motor means rotates said program member from its starting position to its stopping position, wherein said actuator comprises an electrical switch carried by said frame means for energizing said motor means when said switch is held in one position thereof, wherein said manual means comprises a shaft rotatably carried by said frame means and operatively interconnected to said program member for rotating said program member to its starting position, said shaft having means initially holding said switch in said one position thereof when said shaft sets said program member at its starting position, and wherein said means controlled by said program member maintains said switch in said one position thereof until said program member reaches its stopping position.

6. A combination as set forth in claim 5 wherein said shaft carries cam means for camming said switch to said one position thereof when said shaft sets said program member at its starting position.

7. A combination as set forth in claim 6 wherein said switch includes a fixed contact and a movable contact, said cam means being engagable with said movable contact to cam said movable contact into contact with said fixed contact.

8. A combination as set forth in claim 1 and including a pneumatic source, pneumatically operated actuator means, said program member having means for sequentially interconnecting and disconnecting said source to and from said actuator means in a predetermined pattern as said program member moves between its starting and stopping positions, said program member interconnecting said source to one of said actuator means to maintain said actuator in its actuated position until said program reaches its stopping position.

9. A combination as set forth in claim 8 wherein said program member interconnects said source to said one actuator means between its starting and stopping position.

10. A combination as set forth in claim 8 wherein said manual means moves in unison with said program member.

11. A combination as set forth in claim 8 wherein said program member disconnects said source from said one actuator means when said program member reaches its stopping position whereby said actuator is deactuated and said motor means is, thus, deenergized.

12. A combination as set forth in claim 1 and including pneumatically operated actuator means, a pneumatic source, said program member being rotatably carried by said frame means, said motor means rotating said program member from its starting position to its stopped position, said program member having means for sequentially interconnecting and disconnecting said source to and from said actuator means in a predetermined pattern as said program member moves between its starting and stopping positions, said actuator comprising an electrical switch carried by said frame means for energizing said motor means when said switch is held in one position thereof, said manual means comprising a shaft rotatably carried by said frame means and operatively interconnected to said program member for rotating said program member to its starting position, said shaft having means initially holding said switch in said one position thereof when said shaft sets said program member at its starting position, said program member interconnecting said source to one of said actuator means to maintain said switch in said one position thereof until said program member reaches its stopping position.

13. A combination as set forth in claim 12 wherein said shaft carries cam means for camming said switch to said one position thereof when said shaft sets said program member at its starting position.

14. A combination as set forth in claim 13 wherein said switch includes a fixed contact and a movable contact, said cam means being engagable with said movable contact to cam said movable contact into contact with said fixed contact.

15. In combination, a frame means having slot means therein, a pneumatically operated actuator carried by said frame means, an electrical switch carried by said frame means and having a movable member for opening and closing said switch, and a lever pivotally mounted to said frame means and being interconnected to said movable member and said actuator whereby said actuator pivots said lever and, thus, opens and closes said switch as said actuator is connected to and disconnected from a pneumatic source said lever having integral intermediate leg means received in said slot means in said frame means to pivotally mount said lever to said frame means and having integral opposed leg means respectively interconnected to said movable member and said actuator.

16. A combination as set forth in claim 15 wherein said actuator includes a flexible diaphragm cooperating with said frame means to define a chamber therebetween that is connectable with said source to flex said diaphragm, said diaphragm being interconnected to said lever.

17. A combination as set forth in claim 15 wherein said switch includes a support post carried by said frame means, a first contact carried by said post, a spring blade carried by said post and carrying a second contact cooperable with said first contact, said blade being interconnected to said lever.

18. In combination, a frame means, a pneumatically operated actuator carried by said frame means, an electrical switch carried by said frame means and having a movable member for opening and closing said switch, a lever pivotally mounted to said frame means and being interconnected to said movable member and said actuator whereby said actuator pivots said lever and, thus, opens and closes said switch as said actuator is connected to and disconnected from a pneumatic source, said switch including a support post carried by said frame means, a first contact carried by said post, a spring blade carried by said post and carrying a second contact cooperable with said first contact, said blade being interconnected to said lever, other switch means being carried by said post, and another actuator being carried by said frame means to operate said other switch means.

References Cited

UNITED STATES PATENTS 3,284,589  11/1966  Golden et al. _____ 200—46

ROBERT S. MACON, *Primary Examiner.*

HERMAN O. JONES, *Assistant Examiner.*